(12) United States Patent
Liu

(10) Patent No.: US 11,223,434 B2
(45) Date of Patent: Jan. 11, 2022

(54) METHOD FOR COMBATING IMPULSIVE INTERFERENCE/NOISE IN MULTICARRIER UNDERWATER ACOUSTIC COMMUNICATIONS

(71) Applicant: The Government of the United States of America, as represented by the Secretary of the Navy, Arlington, VA (US)

(72) Inventor: Zhiqiang Liu, Henrico, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/942,827

(22) Filed: Jul. 30, 2020

(65) Prior Publication Data

US 2020/0366396 A1     Nov. 19, 2020

Related U.S. Application Data

(63) Continuation of application No. 16/247,626, filed on Jan. 15, 2019, now Pat. No. 10,771,176.

(51) Int. Cl.
*H04K 1/10* (2006.01)
*H04W 72/12* (2009.01)
(Continued)

(52) U.S. Cl.
CPC ............... *H04J 1/05* (2013.01); *H04B 11/00* (2013.01); *H04J 11/003* (2013.01);
(Continued)

(58) Field of Classification Search
CPC ............... H04L 5/0007; H04L 27/2666; H04L 27/2636; H04L 27/2695; H04J 11/003
(Continued)

(56) References Cited

U.S. PATENT DOCUMENTS 5,666,378 A  *  9/1997  Marchetto .............. H04H 20/67
                                                      375/222
2005/0075758 A1* 4/2005  Wakefield, II ....... G05B 19/042
                                                      701/1
(Continued)

*Primary Examiner* — Asad M Nawaz
*Assistant Examiner* — Jason A Harley
(74) *Attorney, Agent, or Firm* — US Naval Research Laboratory; Suresh Koshy

(57) ABSTRACT

A communication system includes a repetitive orthogonal frequency-division multiplexing ("ROFDM")transmitter communicating with an ROFDM receiver. The ROFDM transmitter includes an ROFDM modulator, which includes a K-point Fast Fourier Transform receiving a block of time-domain data symbols and generating an initial orthogonal frequency-division multiplexing symbol. The initial orthogonal frequency-division multiplexing symbol is based on a block of frequency-domain data symbols corresponding to the block of time-domain data symbols. The initial orthogonal frequency-division multiplexing symbol includes an ending part. The ROFDM modulator includes an orthogonal frequency-division multiplexing symbol repeater generating a repetitive orthogonal frequency-division multiplexing symbol by repeatedly reproducing the initial orthogonal frequency-division multiplexing symbol. The modulator includes a cyclic prefix adder pretending a cyclic prefix to the repetitive orthogonal frequency-division multiplexing symbol to generate a baseband transmitted signal. The cyclic prefix includes the ending part of the initial orthogonal frequency-division multiplexing symbol. The ROFDM receiver includes an ROFDM demodulator.

4 Claims, 4 Drawing Sheets

(51) Int. Cl.
*H04L 23/02* (2006.01)
*H04J 1/05* (2006.01)
*H04J 11/00* (2006.01)
*H04B 11/00* (2006.01)
*H04L 27/26* (2006.01)

(52) U.S. Cl.
CPC ...... *H04L 27/2602* (2013.01); *H04L 27/2666* (2013.01); *H04J 2011/0009* (2013.01)

(58) Field of Classification Search
USPC .......................................... 370/344; 455/112
See application file for complete search history.

(56) References Cited

U.S. PATENT DOCUMENTS

| | | | |
|---|---|---|---|
| 2007/0010226 A1* | 1/2007 | Laroia | H04B 1/12 455/296 |
| 2007/0110174 A1* | 5/2007 | Glazko | H04L 27/2665 375/260 |
| 2007/0189320 A1* | 8/2007 | Wu | H04L 5/0007 370/437 |
| 2014/0177547 A1* | 6/2014 | Guo | H04L 5/0053 370/329 |
| 2018/0212810 A1* | 7/2018 | Park | H04L 27/2636 |

* cited by examiner

METHOD FOR COMBATING IMPULSIVE INTERFERENCE/NOISE IN MULTICARRIER UNDERWATER ACOUSTIC COMMUNICATIONS

CROSS-REFERENCE TO RELATED APPLICATIONS

The present application is a continuation of U.S. patent application Ser. No. 16/247,626, which was filed on 15 Jan. 2019 and accordingly claims priority thereto.

BACKGROUND OF THE INVENTION

Field of the Invention

This invention relates in general to a method for multicarrier acoustic communications, and in particular to a method for multicarrier underwater acoustic communications in the presence of at least a strong impulsive noise.

Description of the Related Art

Multicarrier underwater acoustic communications has gained popularity in recent years thanks to its provision of high bandwidth efficiency and low system complexity. All current multicarrier underwater acoustic communication systems have been designed with only the ambient noise in mind, and their performance suffers when a strong impulsive noise is also present in the channel.

Such impulsive noise is common in coastal seas. Unlike the ambient noise that are mostly caused by the shipping noise, surface wind and breaking waves, the main source of the impulsive noise is the noise-generating marine life such as snapping shrimp. In an ocean environment abundant in such marine life, the impulsive noise tends to be strong; having a high impulse rate and a large impulse variance. The impulsive noise consists of random pulses that are relatively short in the time domain but very broad in the frequency domain. Previous analysis has shown that the impulsive noise, when strong, is particularly damaging to multicarrier communications where data symbols are carried in the frequency domain. For multicarrier modulation such as orthogonal frequency division multiplexing ("OFDM"), the corresponding demodulation operation spreads out the effect of the impulsive noise across the entire bandwidth. When the impulsive noise is strong, this could drastically impact every data symbol within the bandwidth, and cause more errors than what classic channel coding can handle. Two approaches are commonly used to combat the impulsive noise: 1) random pulse localization and removal; and 2) Reed-Solomon decoding.

Random Pulse Localization and Removal

The signal processing approach involving random pulse localization and removal amounts to first locating the random pulses in the received signal and then removing them prior to signal recovery. This approach exploits characteristic differences between the communication signal and the impulsive noise, and it is effective if and only if the impulsive noise can be distinguished from the communication signal. Therefore, this approach does not suit well for multicarrier communications because multicarrier communication signals are generally impulse-like.

Reed-Solomon (RS) Decoding

The Reed-Solomon (RS) decoding coding approach exploits the similarity between OFDM modulation and RS coding to mitigate the impulsive noise by treating random pulses as channel-induced errors. However, due to the limited error-correction capability, this approach has been shown ineffective when the impulse rate is high.

BRIEF SUMMARY OF THE INVENTION

An embodiment of the invention includes a communication system. The communication system includes a repetitive orthogonal frequency-division multiplexing transmitter and a repetitive orthogonal frequency-division multiplexing receiver communicating with the repetitive orthogonal frequency-division multiplexing transmitter.

Optionally, the transmitter includes a repetitive orthogonal frequency-division multiplexing modulator. The repetitive orthogonal frequency-division multiplexing modulator includes a K-point Fast Fourier Transform receiving a plurality of time-domain data symbols and generating an initial orthogonal frequency-division multiplexing symbol. The initial orthogonal frequency-division multiplexing symbol is based on a plurality of frequency-domain data symbols corresponding to the plurality of time-domain data symbols. The initial orthogonal frequency-division multiplexing symbol includes an ending part. The repetitive orthogonal frequency-division multiplexing modulator includes an orthogonal frequency-division multiplexing symbol repeater receiving the initial orthogonal frequency-division multiplexing symbol from the K-point Fast Fourier Transform and generating a repetitive orthogonal frequency-division multiplexing symbol by repeatedly reproducing the initial orthogonal frequency-division multiplexing symbol. The repetitive orthogonal frequency-division multiplexing modulator includes a cyclic prefix adder receiving the repetitive orthogonal frequency-division multiplexing symbol from said orthogonal frequency-division multiplexing symbol repeater and generating a baseband transmitted signal by prepending a cyclic prefix to the repetitive orthogonal frequency-division multiplexing symbol, the cyclic prefix comprising the ending part of the initial orthogonal frequency-division multiplexing symbol.

Optionally, the receiver further includes a repetitive orthogonal frequency-division multiplexing demodulator. The repetitive orthogonal frequency-division multiplexing demodulator includes a signal partitioner receiving the baseband received signal from the carrier demodulator. The signal partitioner divides the baseband received signal into a plurality of received sub-signals. The repetitive orthogonal frequency-division multiplexing demodulator includes a noise state classifier receiving the plurality of received sub-signals from the signal partitioner, and generating a plurality of noise-state index sets indexing at least one time instant at which each sub-signal of the plurality of sub-signals is free of the random impulses. The repetitive orthogonal frequency-division multiplexing demodulator includes a time-dependent selective combiner receiving the plurality of received sub-signals from the signal partitioner and the plurality of noise-state index sets from the noise state classifier. The time-dependent selective combiner combines the plurality of sub-signals selectively according to the noise-state index sets thereby generating a received orthogonal frequency-division multiplexing symbol signal free of impulsive noise. The repetitive orthogonal frequency-division multiplexing demodulator includes an orthogonal frequency division multiplexing symbol detector receiving the received orthogonal frequency-division multiplexing symbol signal from the time-dependent selective combiner and decoding the plurality of time-domain data symbols from the received orthogonal frequency-division multiplexing symbol signal.

An embodiment of the invention exhibits high robustness against the impulsive noise. Thanks to ROFDM modulation, the ROFDM receiver is able to completely eliminate the effects of the impulsive noise on symbol recovery. Therefore, its performance is extremely robust against the impulsive noise. ROFDM is well suited for the sea environment with dominant impulsive noise.

An embodiment of the invention exhibits controllable reliability against the ambient noise. In ROFDM, the amount of the processing gain that can be achieved is determined by the number of repetitions. By choosing a proper number of repetitions, ROFDM is thus capable of guaranteeing reliable symbol recovery even if the received SNR is low. This makes it particularly attractive for the case where the system can only afford a single source and a single receiver.

An embodiment of the invention exhibits low system complexity. At the ROFDM receiver, neither signal partition nor noise-state classification requires much computation. And, symbol recovery can be implemented by using fast Fourier transform. Furthermore, similar to classic OFDM, no complicated channel estimation and equalization is needed. Overall, ROFDM enjoys extremely low computational complexity. As a result, an embodiment of the ROFDM system can be implemented at low cost.

DETAILED DESCRIPTION OF TH E INVENTION

Figure 1:
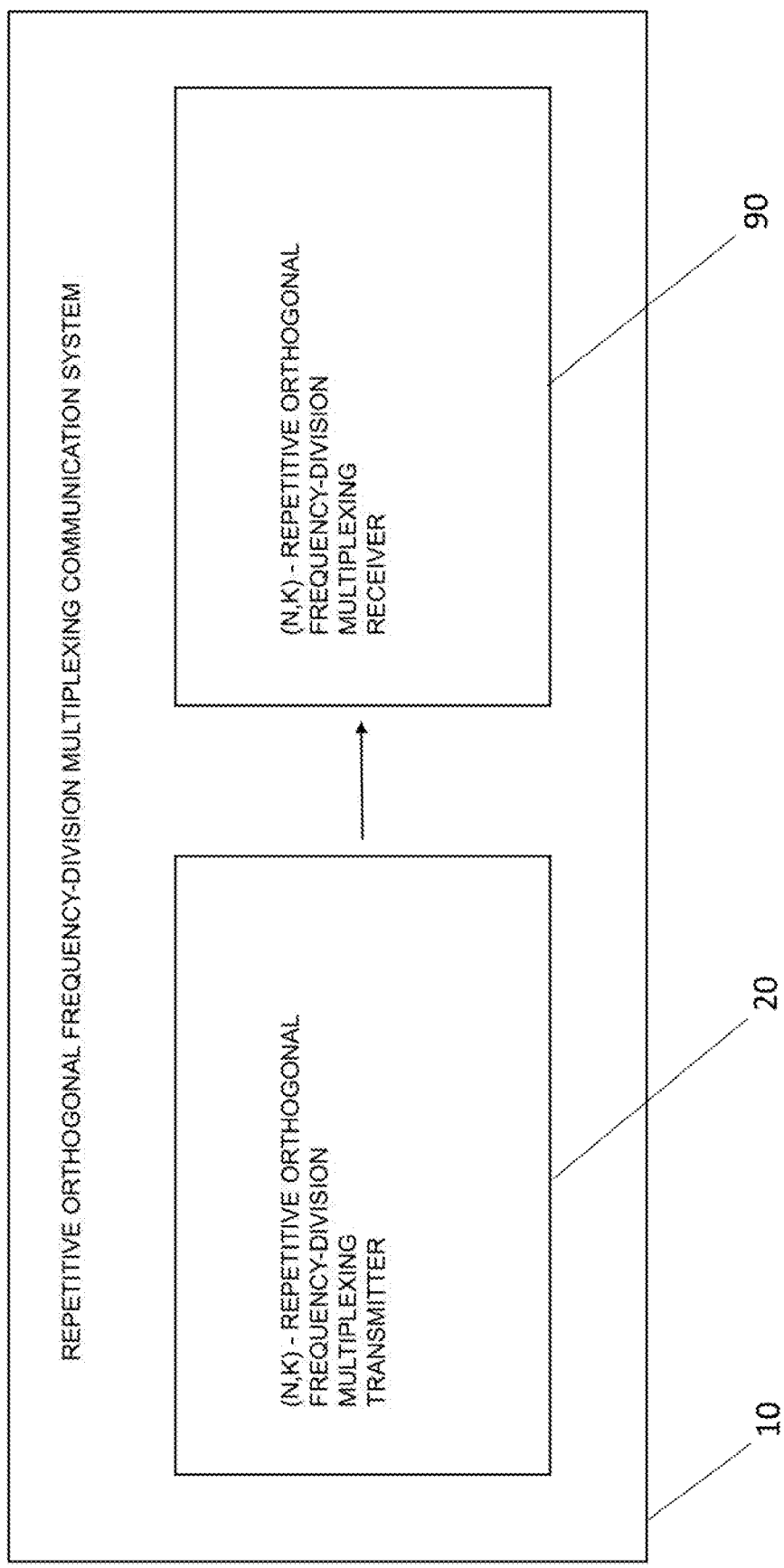
FIG. 1 is a block diagram of an embodiment of a communication system according to the instant invention.
Figure 4:
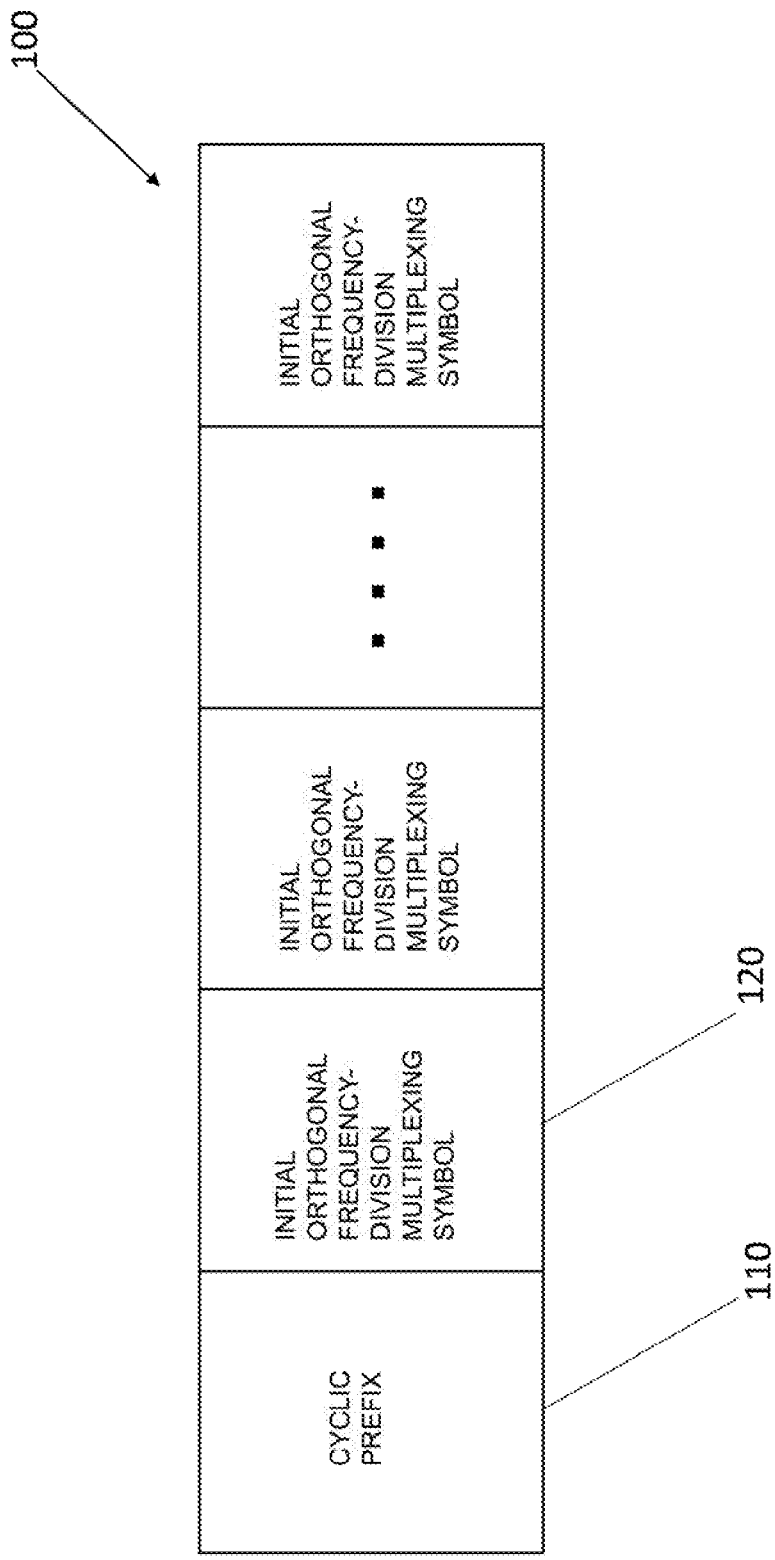
FIG. 4 is a block diagram of an illustrative baseband transmitted signal generated by an embodiment of the invention.

An embodiment of the invention includes a repetitive orthogonal frequency-division multiplexing ("ROFDM") communication system 10, as shown by way of illustration in FIG. 1. The communication system 10 includes an ROFDM transmitter 20, as shown by way of illustration in FIGS. 1 and 2. The ROFDM transmitter 20 includes an ROFDM modulator 30. The ROFDM modulator 30 includes a standard K-point Fast Fourier Transform 40 receiving a block of time-domain data symbols and generating an initial orthogonal frequency-division multiplexing ("OFDM") symbol. The initial OFDM symbol is based on a block of frequency-domain data symbols corresponding to the block of time-domain data symbols. The ROFDM modulator 30 further includes a standard OFDM symbol repeater 50 generating an ROFDM symbol by repeatedly reproducing the initial OFDM symbol. The ROFDM also includes a standard cyclic prefix adder 60 prepending a cyclic prefix to the ROFDM symbol to generate a baseband transmitted signal. The cyclic prefix includes the ending part of the initial OFDM symbol. FIG. 4 shows an illustrative baseband transmitted signal 100. FIG. 4 shows a cyclic prefix 110 and only three repeated initial OFDM symbols 120 for ease of illustration and understanding. In general, a minimum of two repeated initial OFDM symbols are required for one ROFDM symbol, and more initial OFDM symbols foster better symbol recovery in the presence of ambient and impulsive noise in the transmission medium (e.g., an undersea channel environment). However, one of ordinary skill in the art will readily appreciate that there is a tradeoff between bandwidth efficiency and performance against impulsive noise.

Optionally, the ROFDM transmitter 20 further includes a standard channel encoder 70 receiving an input signal. The input signal includes a plurality of information bits. The channel encoder 70 generates the plurality of time-domain data symbols by adding redundancy to the plurality of information bits, e.g., using standard block and convolutional codes. The channel encoder 70 transmits the plurality of time-domain data symbols to the ROFDM modulator 30. Optionally, the ROFDM transmitter 20 further includes a standard carrier modulator 80 receiving the baseband transmitted signal from the ROFDM modulator 30, shifting the baseband transmitted signal to a proper passband, and transmitting a passband transmitted signal.

Figure 3:
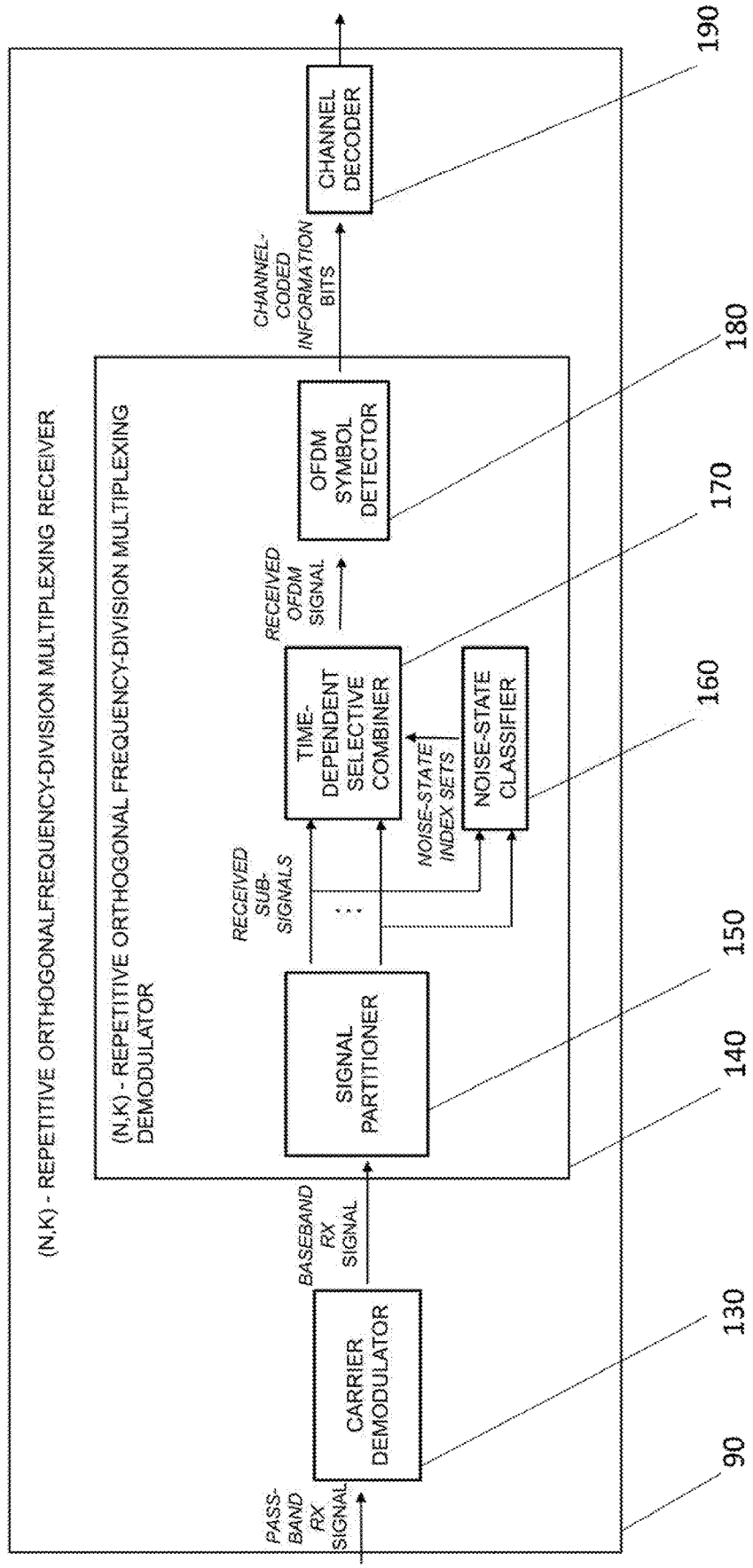
FIG. 3 is a block diagram of an embodiment of a receiver in a communication system according to the instant invention.

The ROFDM communication system 10 further includes an ROFDM receiver 90 communicating with the ROFDM transmitter 20, as shown by way of illustration in FIGS. 1 and 3. The ROFDM receiver 90 includes a standard carrier demodulator 130 receiving the passband transmitted signal, shifting the passband transmitted signal to a standard baseband, and generating a baseband received signal.

The ROFDM receiver 90 further includes an ROFDM demodulator 140 receiving the baseband received signal from the carrier demodulator 100. The ROFDM demodulator 140 includes a standard signal partitioner 150 receiving the baseband received signal from the carrier demodulator 130. The signal partitioner 150 divides the baseband received signal into a plurality of received sub-signals. The ROFDM demodulator 90 also includes a noise state classifier 160. In an embodiment of the invention, the noise state classifier 160 is implemented mainly in software. Illustrative details of a noise state classification algorithm therefore are provided below. The noise state classifier 160 receives the plurality of received sub-signals from the signal partitioner 150 and generating a plurality of noise-state index sets indexing at least one time instant at which each sub-signal of the plurality of sub-signals is free of the random impulses. The plurality of noise-state index sets is generated according to the noise state classification algorithm. The ROFDM demodulator 90 further includes a time-dependent selective combiner 170 receiving the plurality of received sub-signals from the signal partitioner 150 and the plurality of noise-state index sets from the noise state classifier 160. The time-dependent selective combiner 170 combines the plurality of sub-signals selectively according to the plurality of noise-state index sets thereby generating a received orthogonal frequency-division multiplexing symbol signal free of impulsive noise. The ROFDM demodulator 90 further includes a standard OFDM detector 180. The OFDM symbol detector 180 decodes the block of K time-domain data symbols from the received OFDM symbol signal to generate channel-coded information bits and transmits same to a standard channel decoder 190. The ROFDM receiver 90 further includes a channel decoder 190. The channel decoder 190 in a standard manner removes the redundancy generated by the channel encoder 70 to recover the input signal including a plurality of information bits.

An embodiment of the invention is directed to a novel multicarrier communication system 10, for example, tailored to a challenging undersea channel environment where a strong impulsive noise is present in addition to the ambient noise. This channel environment, for example, is typical in coastal seas and has been observed in many shallow-water sea experiments. An embodiment of the invention takes an approach different from the two existing approaches discussed above in the Background of the Invention. Instead of relying solely on receiver processing to mitigate the impulsive noise, the multicarrier communication system 10 according to an embodiment of the invention includes a cooperating transmitter and receiver. An embodiment of the invention is based upon a new multicarrier modulation scheme called ROFDM; ROFDM is a term of art for the purpose of this patent application. ROFDM, for the purpose of this patent application, is described below with respect to components and operation of a transmitter and receiver according to one or more embodiments of the invention.

The ROFDM Transmitter

Figure 2:
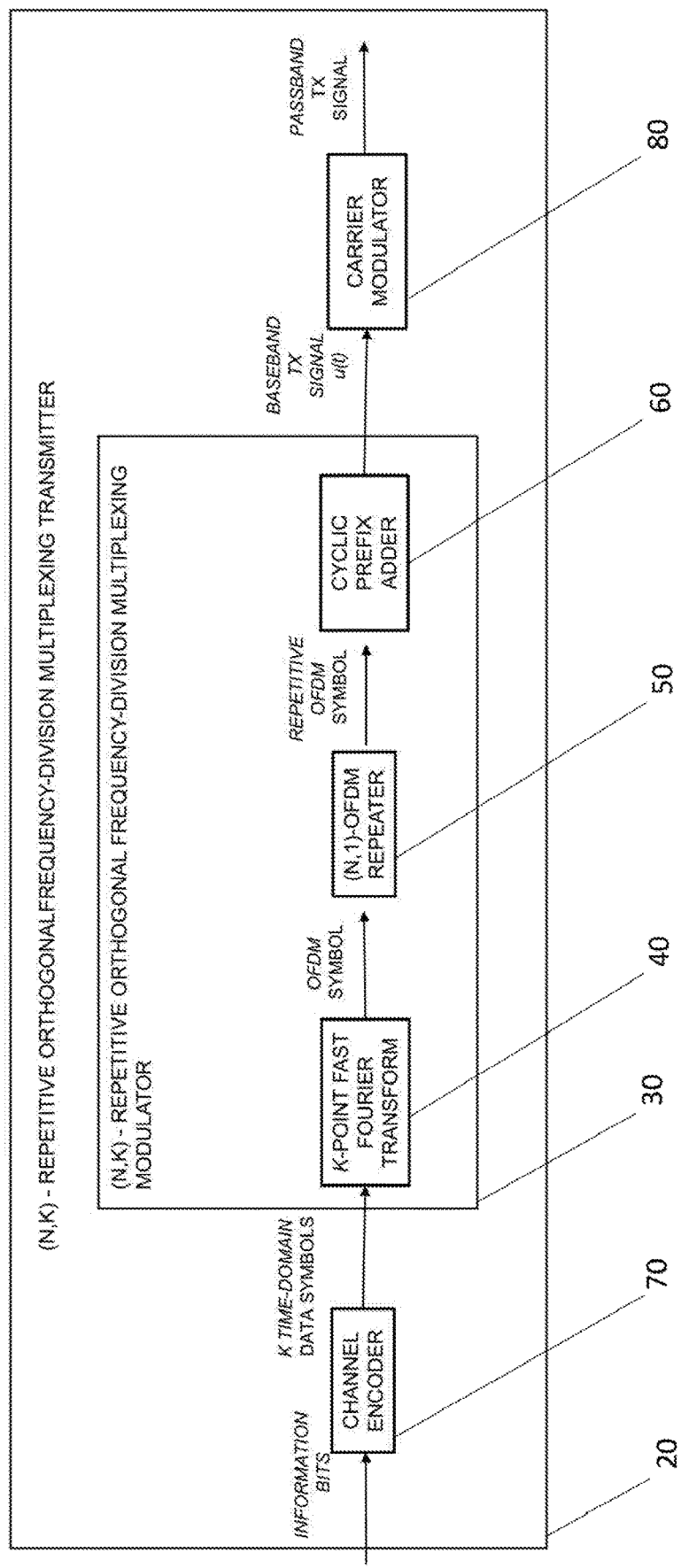
FIG. 2 is a block diagram of an embodiment of a transmitter in a communication system according to the instant invention.

At the ROFDM transmitter 20, according to an embodiment of invention, data symbols are transmitted in blocks of size K. The function of ROFDM modulation is to map each block to an ROFDM signal prior to transmission. As depicted in FIGS. 1 and 2, the operation of (N,K)-ROFDM modulation is composed of three successive steps: K-point Fast Fourier transform (FFT), (N−1) repetitions, and cyclic prefix ("CP") addition. The difference between (N,K)-ROFDM modulation and classic OFDM lies in that classic OFDM includes no repetition. Therefore, ROFDM can be viewed as a generalized form of classic OFDM. Mathematically, a (N,K)-ROFDM signal, for the purpose of this patent application, is expressed as:

$$u(t) = \sum_{k=-\frac{K}{2}}^{\frac{K}{2}-1} a_k e^{j2\pi k \Delta_f t}, -T_{cp} < t < NT_0 \quad (1)$$

where K is the number of subcarriers, $a_k$'s are information-bearing data symbols, $\Delta_f$ denotes subcarrier spacing, $T_{cp}$ is the duration of the CP and $T_0$ is the duration of one OFDM symbol. The signaling structure of u(t) is shown by way of illustration in FIG. 4.

Just like (N,1)-repetition coding, the repetition in (N,K)-ROFDM decreases the bandwidth efficiency by a factor of about N. While this loss of bandwidth efficiency might seem significant, such repetition is deemed necessary for the channel/noise environment (no transmitter array, no receiver array, strong ambient/impulsive noise) this invention targets at. The repetition at the transmitter not only enables the receiver to collect a processing gain in combating the ambient noise but, more importantly, makes it possible for the receiver to locate and then remove the impulsive noise prior to symbol recovery. As a result, much better system performance can be achieved, which in return can be used to trade back efficiency loss. This is in the same spirit of channel coding and spread spectrum technologies that have been widely used for performance enhancement in challenging channel/noise environments.

Noise/Data Model

An embodiment of the invention concerns the case where the noise is composite and contains the contribution from an impulsive noise and an ambient noise. Mathematically, such noise is modeled as:

$$n(t) = w_a(t) + v(t) \quad (2)$$

where the ambient noise $w_a(t)$ is a zero-mean Gaussian random process with variance $\sigma_a^2$, and the impulsive noise v(t) is a Bernoulli Gaussian random process:

$$v(t) = b(t) w_i(t) \quad (3)$$

with $w_i(t)$ denoting a zero-mean Gaussian random process with variance $\sigma_i^2 \gg \sigma_a^2$, and b(t) an i.i.d. Bernoulli random process, taking a value of "1" or "0" with probability $p_i$ or $(1-p_i)$, respectively. As per Equations (2) and (3), the noise n(t) must belong to one of two possible states at any given time. The noise n(t) is said to be at the "high" state if $n(t)=w_a(t)+w_i(t)$, and at the "low" state if $n(t)=w_a(t)$. The "high" and "low" states occur with probabilities $p_i$ and $(1-p_i)$, respectively, and are expected to be quite distinct because of $\sigma_i^2 \gg \sigma_a^2$.

A standard single-input single-output ("SISO") multipath channel between the ROFDM transmitter 20 and the ROFDM receiver 90 is considered as follows. Under the noise model of Equation (2), the received ROFDM signal (after discarding the cyclic prefix) is expressed as $$r(t) = x(t) + n(t), \; 0 < t < NT_0 \quad (4)$$

where $$x(t) = \sum_k a_k H_k e^{j2\pi k \Delta_f t}, \; 0 < t < NT_0 \quad (5)$$

is the noise-fre received signal with $H_k$ denoting the sub-channel gain experienced by the k-th subcarrier. A typical received ROFDM signal suffers from a significant amount of the impulsive noise, and has a relatively low signal-to-noise ratio ("SNR"). For example, the impulsive noise signal is multiples larger than the signal and may only last for a fraction of a second.

The ROFDM Receiver

The ROFDM receiver 90 according to an embodiment of the invention ensures reliable symbol recovery from the received ROFDM signal when the ambient noise and the impulsive noise are both strong. FIG. 3 shows an illustrative system diagram of the ROFDM receiver. In what follows, the operation of its functional units are described.

Signal Partition

A unit of signal partition, or the signal partitioner 150, is used to divide the received signal r(t) into N signals $r_m(t)$, m=1, . . . , N:

$$r_m(t) = x_m(t) + n_m(t), t \in [0, T_0] \quad (6)$$

where $r_m(t) = r(t+(m-1)T_0)$, $x_m(t) = x(t+(m-1)T_0)$ and $n_m(t) = n(t+(m-1)T_0)$. By using Equation (5), one property of the N signals $r_m(t)$'s is observed; their signal parts $x_m(t)$'s are all identical. This important property is exploited to locate and remove the impulsive noise prior to symbol recovery. It is worth pointing out that this property becomes available only when ROFDM modulation is employed at the transmitter.

Noise State Classification

A unit of noise state classification, or the noise state classifier 160, is used to classify the noise state of each of the N signals $r_m(t)$'s for all time instants t. Recall that at any given time instant t, $r_m(t)$'s are supposed to be identical in the absence of the noise. The noise state classification of $r_m(t)$ can be thus carried out by simply checking whether $r_m(t)$ is an outlier within the sample set $R(t)=\{r_1(t), \ldots, r_N(t)\}$. If it is, then $r_m(t)$ is at the "high noise" state; otherwise, it is at the "low noise" state. It is noted that such noise state classification is impossible for classic OFDM. To identify outliers in the sample set R(t), the following largest-neighborhood ("LN") algorithm is, for example, used:

Step 1. For a given t, compute N noise-state index sets $\{l_m(t)\}_{m=1}^N$:

$l_m(t)=\{j:\|\bar{r}_m(t)-\bar{r}_j(t)\|<\rho\}$ where the threshold $\rho$ is determined by noise variances $\sigma_i^2$ and $\sigma_a^2$.

Step 2. Pick the largest set (say, l(t)) among $\{l_m(t)\}_{m=1}^N$. The noise-state index set I(t) contains indexes of those signals in R(t) that have not been impacted by impulsive noise for a given t.

Step 3. Repeat Step 1 and Step 2 until l(t) is found for all time instants $t \in [0, T_0]$.

Time-Dependent Selective Combining

A unit of time-dependent selective combining ("TDSC"), or time-dependent selective combiner 170, is used to mitigate both the impulsive noise and the ambient noise prior to symbol recovery. The operation of the time-dependent selective combiner 170 amounts to forming a combined signal y(t) as:

$$y(t) = \frac{1}{|l(t)|} \sum_{m \in l(t)} r_m(t) \qquad (7)$$

where |l(t)| stands for the cardinality of the noise-state index set l(t) obtained via LN algorithm. As evident in (7), at any given time, the time-dependent selective combiner 170 only involves those received signals that have been determined to be free of impulse noise at that time. Because the noise state generally varies with time, the time-dependent selective combiner 170 is thus both time-dependent and selective, as its name implies. By only involving received samples free of impulse noise, the time-dependent selective combiner 170 is capable of eliminating the effects of the impulsive noise, while mitigating those of the ambient noise by offering a processing gain. The time-dependent selective combiner 170 has been proved optimal in the sense that it maximizes the SNR of y(t) among all linear combining methods.

OFDM Symbol Recovery

A unit of OFDM symbol detector 180 is used to recover data symbols $a_k$'s from the combined signal y(t). By using Equations (5) and (6), y(t) in Equation (7) can be rewritten as:

$$y(t) = \underbrace{\sum_k a_k H_k e^{j2\pi k \Delta f t}}_{signal} + w_e(t) \qquad (8)$$

where $w_e(t)$ represents the effective noise after the time-dependent selective combiner 170. Because y(t) is nothing but the received signal of classic OFDM, one can thus recover data symbols using one of those many standard methods that have been designed for classic OFDM. This also suggests that ROFDM is capable of preserving the most desirable features of classic OFDM.

An embodiment of the invention comprises a computer program instructions, which computer program instructions embody the steps, functions, filters, and/or subsystems described herein relative to iterative process for generating the highest-rated device response. However, it should be apparent that there could be many different ways of implementing the invention in computer programming, and the invention should not be construed as limited to any one set of computer program instructions. Further, a skilled programmer would be able to write such a computer program to implement an exemplary embodiment based on the appended diagrams and associated description in the application text. Therefore, disclosure of a particular set of program code instructions is not considered necessary for an adequate understanding of how to make and use the invention.

One of ordinary skill in the art will recognize that the methods, systems, and control laws discussed above may be implemented in software as software modules or instructions, in hardware (e.g., a standard application-specific integrated circuit ("ASIC")), a standard field programmable gate array ("FPGA"), or in a combination of software and hardware. The methods, systems, and control laws described herein may be implemented on many different types of processing devices by program code comprising program instructions that are executable by one or more processors. The software program instructions may include source code, object code, machine code, or any other stored data that is operable to cause a processing system to perform methods described herein.

The methods, systems, and control laws may be provided on many different types of standard computer-readable media including standard computer storage mechanisms (e.g., CD-ROM, diskette, RAM, flash memory, computer's hard drive, etc.) that contain instructions for use in execution by a standard processor to perform the methods' operations and implement the systems described herein.

The computer components, software modules, functions and/or data structures described herein may be connected directly or indirectly to each other in order to allow the flow of data needed for their operations. It is also noted that software instructions or a module can be implemented for example as a subroutine unit or code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

Systems and methods disclosed herein may use data signals conveyed using networks (e.g., local area network, wide area network, internet, etc.), fiber optic medium, carrier waves, wireless networks, etc. for communication with one or more data-processing devices. The data signals can carry any or all of the data disclosed herein that is provided to or from a device.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed as new and desired to be protected by Letters Patent of the United States is:

1. A communication system comprising:
   a repetitive orthogonal frequency-division multiplexing transmitter;
   a repetitive orthogonal frequency-division multiplexing receiver communicating with said repetitive orthogonal frequency-division multiplexing transmitter,
   wherein said transmitter comprises:
   a repetitive orthogonal frequency-division multiplexing modulator comprising:
      a K-point Fast Fourier Transform receiving a plurality of time-domain data symbols and generating an initial orthogonal frequency-division multiplexing symbol, the initial orthogonal frequency-division multiplexing symbol being based on a plurality of frequency-domain data symbols corresponding to the plurality of time-domain data symbols, the initial orthogonal frequency-division multiplexing symbol comprising an ending part;
      an orthogonal frequency-division multiplexing symbol repeater receiving the initial orthogonal frequency-division multiplexing symbol from said K-point Fast Fourier Transform and generating a repetitive orthogonal frequency-division multiplexing symbol by repeatedly reproducing the initial orthogonal frequency-division multiplexing symbol; and
      a cyclic prefix adder receiving the repetitive orthogonal frequency-division multiplexing symbol from said orthogonal frequency-division multiplexing symbol repeater and generating a baseband transmitted signal by prepending a cyclic prefix to the repetitive orthogonal frequency-division multiplexing symbol, the cyclic prefix comprising the ending part of the initial orthogonal frequency-division multiplexing symbol.

2. The communication system according to claim 1, wherein said transmitter further comprises:
   a channel encoder receiving an input signal comprising a plurality of information bits, said channel encoder generating the plurality of time-domain data symbols by adding redundancy to the plurality of information bits, said channel encoder transmitting the plurality of time-domain data symbols to said repetitive orthogonal frequency-division modulator.

3. The communication system according to claim 1, wherein said transmitter further comprises:
   a carrier modulator receiving the baseband transmitted signal from said cyclic prefix adder, shifting the baseband transmitted signal to a passband, and transmitting a passband transmitted signal.

4. A communication system according to claim 1 wherein said receiver further comprises:
   a carrier demodulator receiving a passband received signal, shifting the passband received signal to a baseband, and generating a baseband received signal.

* * * * *